(12) United States Patent
Tanskanen

(10) Patent No.: US 7,874,601 B2
(45) Date of Patent: Jan. 25, 2011

(54) CRASH BOX FOR A VEHICLE

(75) Inventor: Michael Tanskanen, Rosvik (SE)

(73) Assignee: Gestamp Hardtech AB, Lulea (SE)

( * ) Notice: Subject to any disclaimer, the term of this patent is extended or adjusted under 35 U.S.C. 154(b) by 203 days.

(21) Appl. No.: 12/227,083

(22) PCT Filed: May 16, 2007

(86) PCT No.: PCT/SE2007/000475

§ 371 (c)(1),
(2), (4) Date: Nov. 5, 2008

(87) PCT Pub. No.: WO2007/136320

PCT Pub. Date: Nov. 29, 2007

(65) Prior Publication Data

US 2009/0102210 A1 Apr. 23, 2009

(30) Foreign Application Priority Data

May 19, 2006 (SE) .................................. 0601121

(51) Int. Cl.
*B60R 19/34* (2006.01)
*B60R 19/24* (2006.01)
(52) U.S. Cl. .................................. 293/133; 296/187.09
(58) Field of Classification Search ............ 296/187.01, 296/187.03, 187.09, 187.1, 193.01, 193.09, 296/203.01, 203.02; 293/102, 103, 132, 293/134, 142, 143, 155
See application file for complete search history.

(56) References Cited

U.S. PATENT DOCUMENTS

| 5,378,031 | A | * | 1/1995 | Ohno et al. ................. 293/102 |
| 5,727,827 | A | | 3/1998 | Shibuya et al. |
| 6,364,384 | B1 | * | 4/2002 | Kemp et al. ................. 293/120 |
| 6,439,650 | B2 | * | 8/2002 | Artner et al. ........... 296/187.03 |
| 6,485,072 | B1 | * | 11/2002 | Werner et al. ............... 293/132 |
| 6,814,381 | B1 | * | 11/2004 | Frank .......................... 293/133 |
| 6,926,325 | B2 | * | 8/2005 | Frank .......................... 293/133 |
| 7,077,442 | B2 | * | 7/2006 | Arns ........................... 293/155 |
| 7,357,432 | B2 | * | 4/2008 | Roll et al. .................... 293/133 |
| 7,401,825 | B2 | * | 7/2008 | Frank et al. ................. 293/155 |
| 7,413,226 | B2 | * | 8/2008 | Muskos ....................... 293/133 |
| 7,490,855 | B2 | * | 2/2009 | Inayoshi et al. ............. 280/777 |
| 7,651,155 | B2 | * | 1/2010 | Tan et al. ............... 296/187.03 |
| 2008/0030031 | A1 | * | 2/2008 | Nilsson ....................... 293/133 |
| 2009/0261602 | A1 | * | 10/2009 | Karlander .................... 293/132 |

FOREIGN PATENT DOCUMENTS

| EP | 0856681 | 8/1998 |
| EP | 1464546 | 10/2004 |
| WO | WO 2005090128 | 9/2005 |

\* cited by examiner

*Primary Examiner*—Patricia L Engle
(74) *Attorney, Agent, or Firm*—Mark P. Stone

(57) ABSTRACT

A crash box (11,12) is positioned high relative to the bumper beam (13) on, for example, an SUV. The underside (22) of the crash box has a profiled cross-section with upper (25,26) and lower (24) longitudinal portions. At least one upward profile portion (25,26) changes to being a downward-pointing profile portion (27,28) near to the outer end of the crash box, thereby increasing the vertical extent of the crash box. The underside of the crash box may have a hat profile which at its outer end changes to an inverted hat profile.

4 Claims, 5 Drawing Sheets

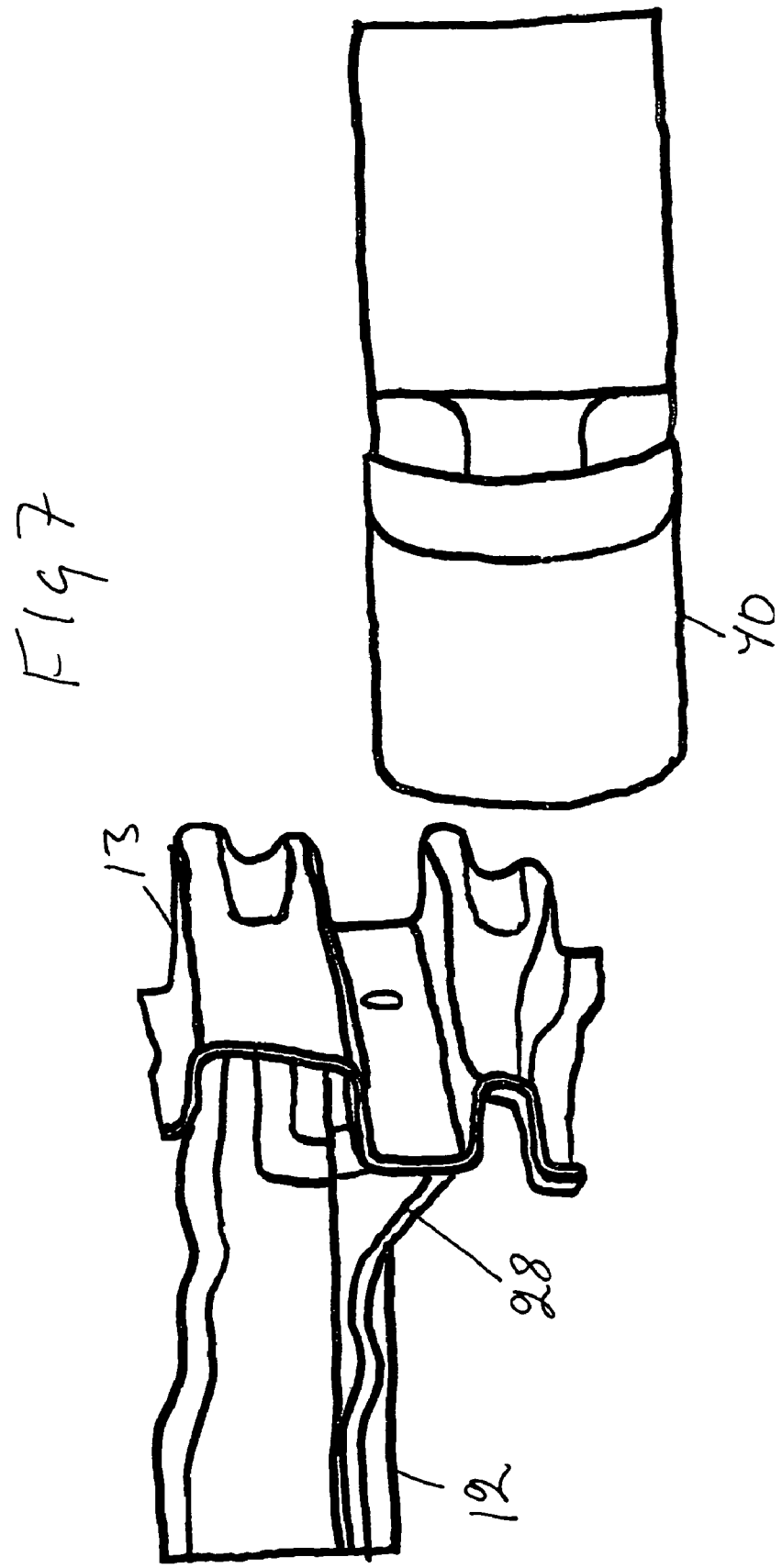

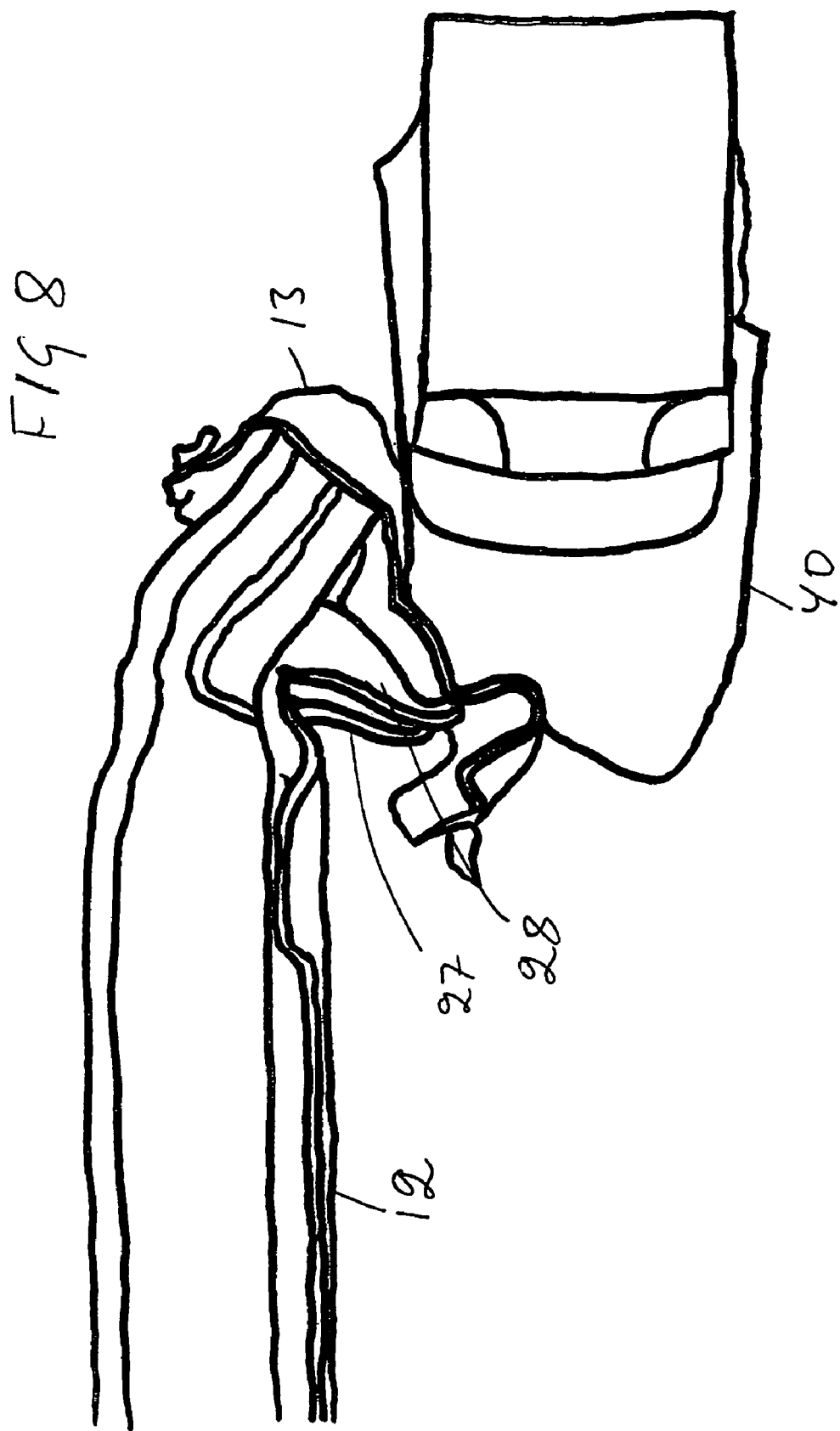

CRASH BOX FOR A VEHICLE

TECHNICAL FIELD

The present invention relates to a crash box for a vehicle where the crash box is positioned high relative to the bumper rail.

BACKGROUND TO THE INVENTION

Collision tests of various kinds are done to ensure that bumpers on different vehicles can meet and function in a collision. The bumpers are usually fastened to the vehicle's side rails, and a vehicle with high-positioned side rails, e.g. an SUV, needs a bumper which functions even when colliding with a passenger car with low-positioned side rails.

OBJECT AND BRIEF DESCRIPTION OF THE INVENTION

It is an object of the invention to provide a crash box adapted to a bumper rail which is positioned lower than the attachment of the crash box and which functions satisfactorily when it collides with a vehicle with a low-positioned bumper or collides with a barrier.

This object is achieved generally by the underside of the crash box having a profiled cross-section with upper and lower longitudinal portions, and at least one raised profile portion changes to being a downward-pointing profile portion near to the outer end of the crash box, thereby increasing the vertical extent of the crash box. The invention is defined in this respect by the claims.

BRIEF DESCRIPTION OF THE DRAWINGS

FIG. 7 depicts in side view the bumper arrangement according to the above figures before a collision with a dummy bumper.

FIG. 8 corresponds to FIG. 7 but it shows the arrangement after the collision.

DESCRIPTION OF THE ILLUSTRATED AND PREFERRED EMBODIMENT

Figure 1:
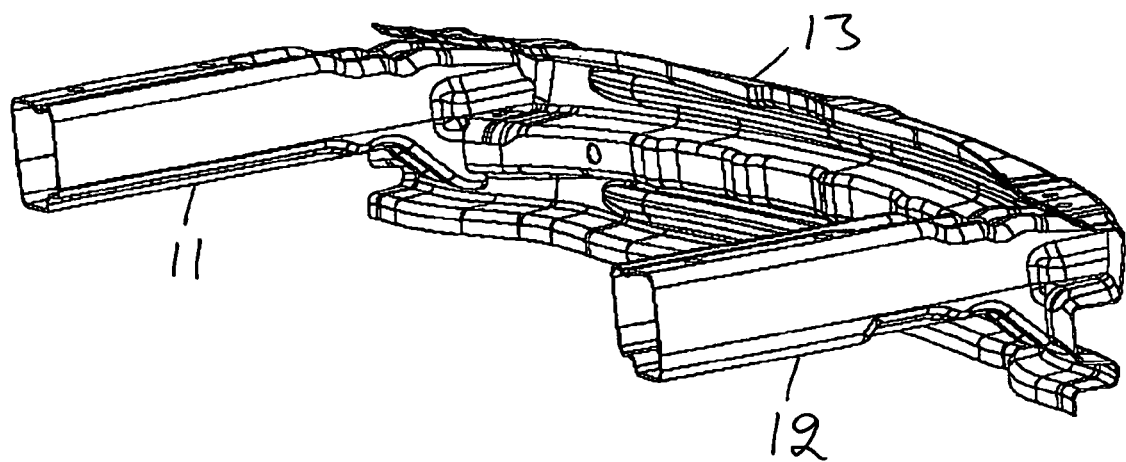
FIG. 1 depicts in perspective view a bumper arrangement with crash boxes in accordance with the invention.
Figure 2:
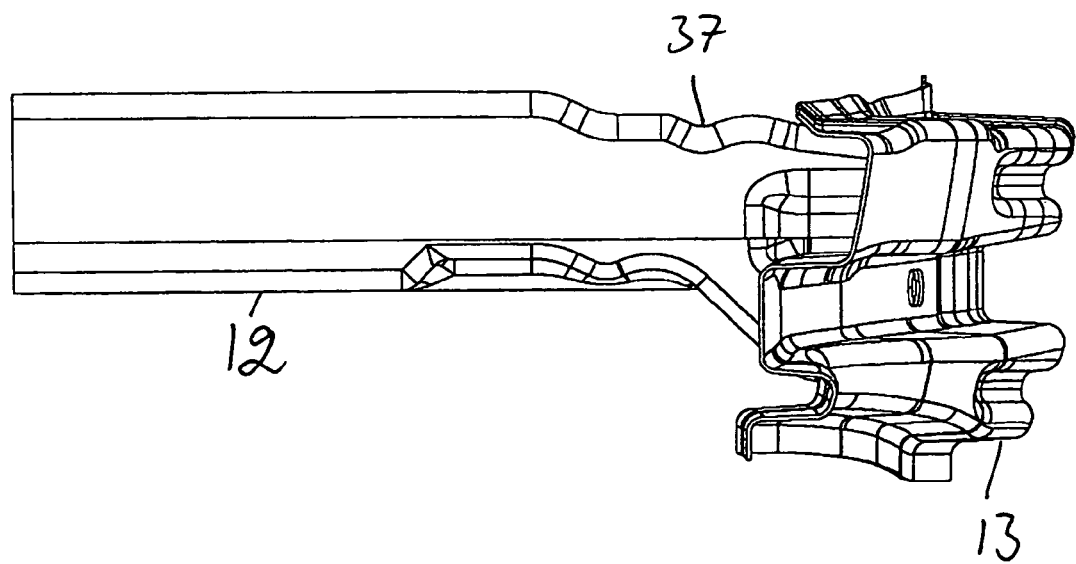
FIG. 2 depicts the same bumper arrangement in side view.

FIGS. 1 and 2 depict a forward bumper arrangement comprising two crash boxes 11,12 which support a bumper beam 13. The rear portions of the crash boxes have their cross-sections adapted to the cross-sections of the vehicle's side members in order to be able to transmit longitudinal forces directly to the side members. The attachment to the side members is not depicted but may be effected with end plates both on the side members and on the crash boxes and these end plates may be bolted together. The front ends of the crash boxes are adapted to the bumper beam's cross-section and are welded to the bumper beam.

Figure 3:
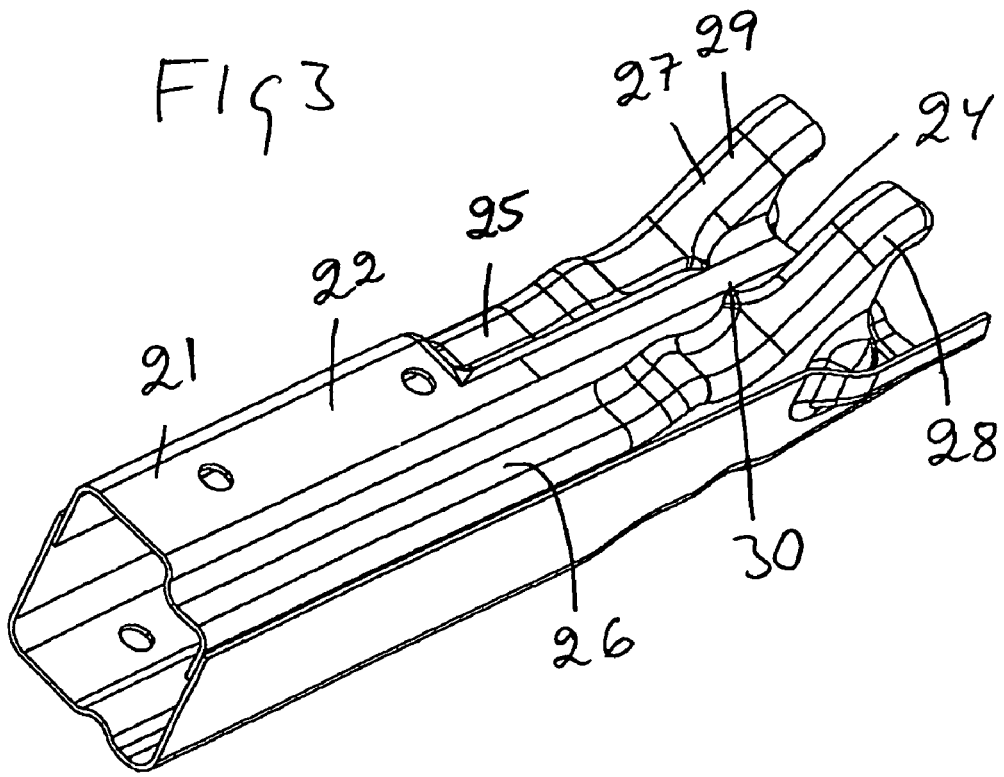
FIG. 3 is a perspective view of a crash box according to the above figures and it is seen from beneath.
Figure 4:
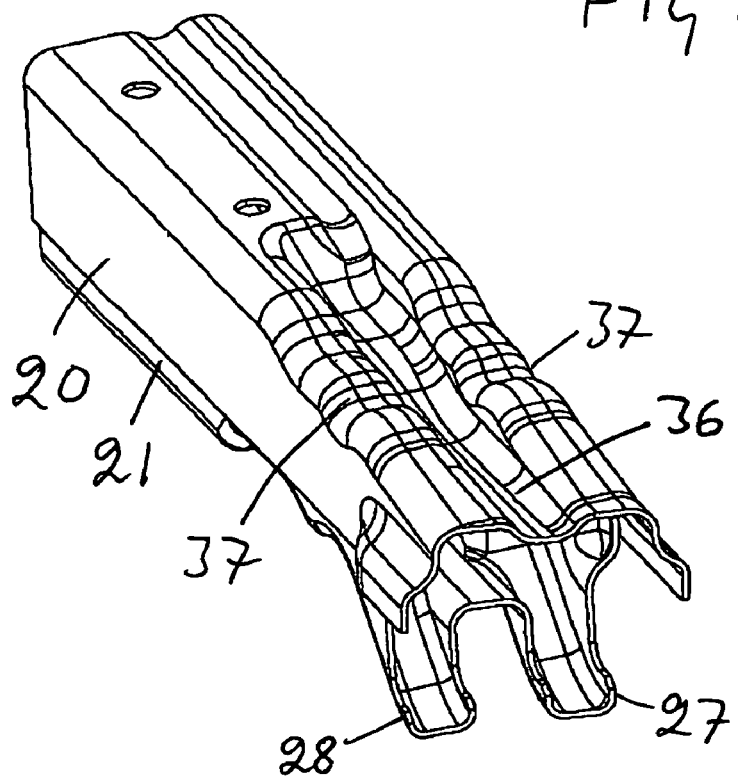
FIG. 4 depicts the crash box in FIG. 3 as seen from above.

FIG. 4 depicts the crash box 12 as seen obliquely from above and FIG. 3 depicts the same crash box as seen obliquely from beneath. It comprises an upper U-section 20 and a lower U-section 21 made of high-strength steel which overlap and are welded together to form a box beam, i.e. a beam with closed profile. The U-sections may be cold-formed from flat bars of high-strength cold-forming steel but may alternatively be hot-formed and then hardened in a fixture, e.g. in one step in the so-called "press-hardening" process.

The lower U-section 21 has an underside 22 which at least in a forward portion 23 has a hat profile, i.e. it has a crown 24 and two side flanges 25,26. The forward portions 27,28 of the side flanges are bent downwards so that the very foremost portion 29 of the underside has an inverted hat profile, i.e. the crown changes from pointing outwards to pointing inwards. The upward profile portions of the underside, i.e. the side flanges 25,26, change to being downward-pointing profile portions 27,28 so that the vertical extent of the crash box increases. At the transition denoted by ref. 30, the underside 22 is substantially planar and hence has reduced resistance to bending specifically in that region.

Figure 5:
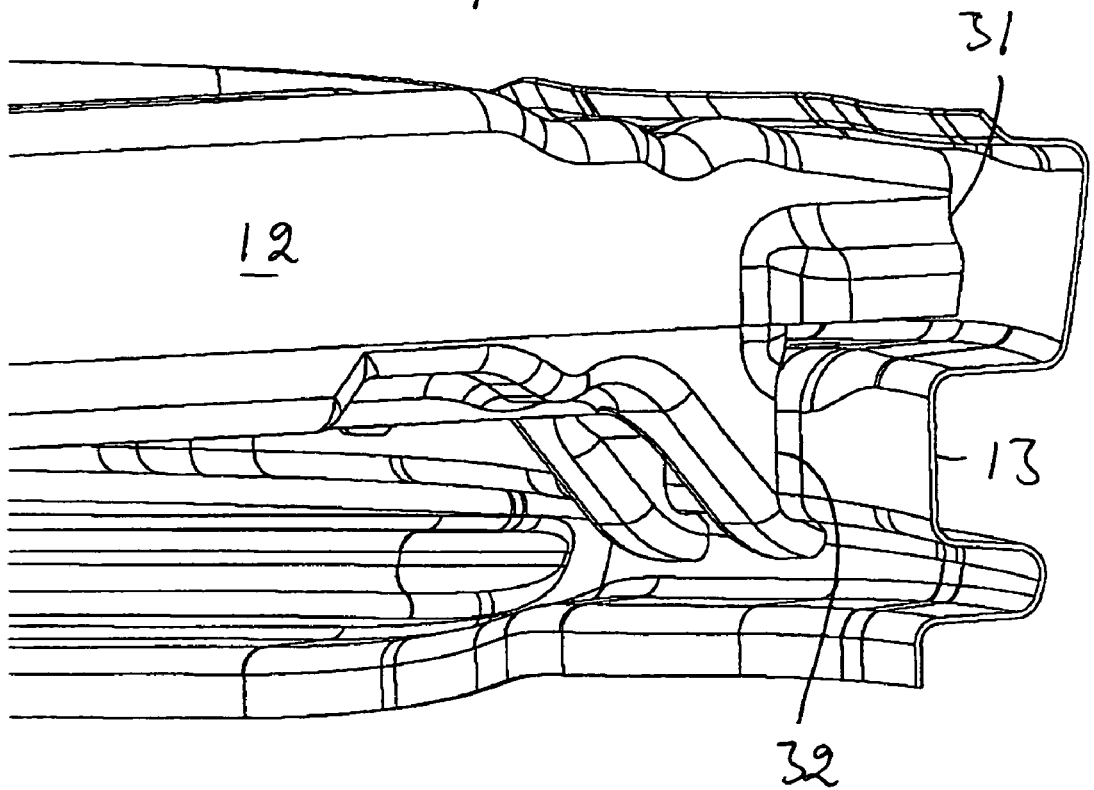
FIG. 5 is an enlargement of the attachment of the crash box to a bumper beam according to FIGS. 1 and 2 as seen in perspective view looking out towards the end of the bumper beam.
Figure 6:
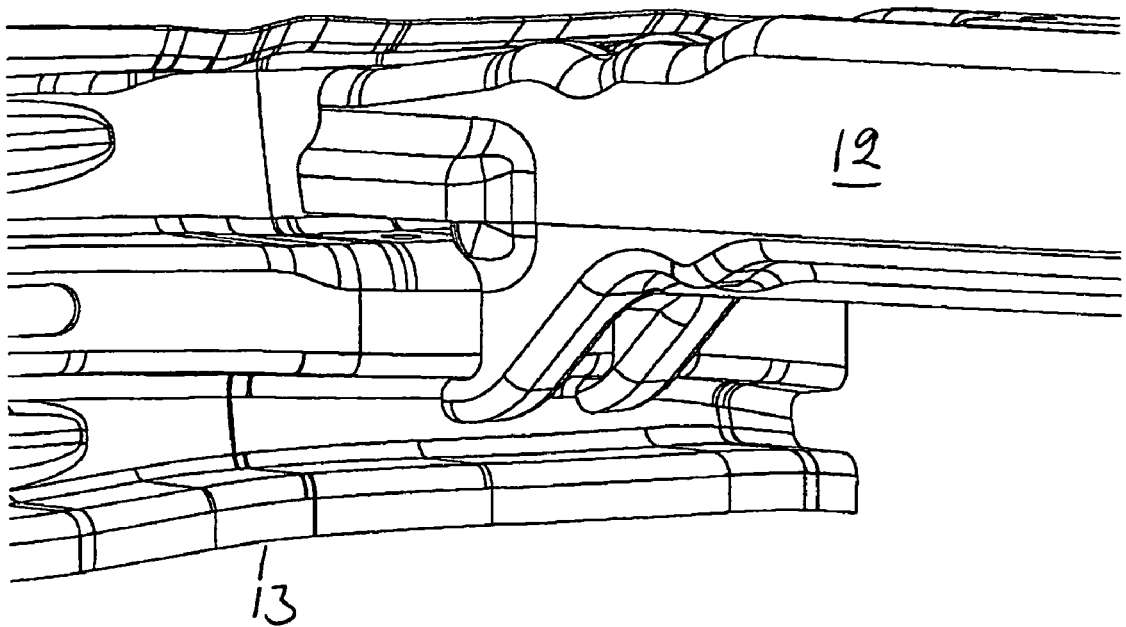
FIG. 6 corresponds to FIG. 5 but it is seen from the middle of the bumper beam looking outwards towards its end.

The crash box 12 is adapted to the shape of the bumper rail so that both the upper U-section 20 and the lower U-section 21 abut axially against the bumper beam at 31 and 32 respectively, as illustrated in FIGS. 5 and 6. Since the bumper rail is bent, the crash boxes will not be entirely symmetrical, as illustrated in FIG. 5 which depicts the crash box 12 as seen from the end of the bumper rail and FIG. 6 which depicts it as seen looking out towards the end of the bumper rail. The two crash boxes are mirror image to one another, since the bumper beam is symmetrical about a vertical central plane. If the bumper beam has some other cross-section than that depicted, the crash boxes have to be adapted accordingly.

The back, i.e. the top, of the upper U-section has a longitudinal concavity 36 best illustrated in FIG. 4. It also has transverse triggers 37, i.e. deformation initiators, and the forward portion slopes somewhat forwards. The crash box may also have deformation initiators further rearward and their positioning and appearance may be varied to suit each specific bumper arrangement.

FIG. 7 depicts the crash box 12 and the bumper rail 13 just before a collision with a standardised dummy bumper 40 at a standardised height in a so-called "bumper to bumper" test. The dummy bumper will only meet the bumper rail at the lower U-section 21 of the crash box.

FIG. 8 depicts the deformations due to the collision. The downward-pointing profile portions 27,28 of the lower U-section 21 of the crash box fold rearwards and take with them the forward portions of the upper U-section which fold downwards. The crash boxes are thus prevented from bending at their attachment end. Despite the high positioning of the crash boxes, the bumper beam 13 will not climb up over the dummy bumper 40 and the bumper arrangement will function satisfactorily in this type of collision.

In a collision with a barrier affecting the whole height and not merely the lower part, the two downward-facing profile portions 27,28 will initially give way and bend rearwards at the weak portion 30, thereby preventing the occurrence of such a large bending moment downwards that the crash box would bend downwards at its attachment. The deformation initiators 37 initiate deformation axially and in this situation when the upper U-section 20 absorbs forces in its longitudinal direction it does not bend downwards but rather tend to bend upwards at the deformation initiators 37.

The crash boxes thus function satisfactorily in the two major types of collision.

In the embodiment example of the invention described above, the lower surface of the crash box has the shape of a hat profile with side flanges constituting the profile portions which change from being upward to pointing downwards. In an alternative embodiment, the crown of the hat profile might instead be the upward profile portion which changes to being a downward-pointing profile portion. The lower surface may also have some other profile than a hat profile, and other modifications are also possible within the scope of the claims.

The invention claimed is:

1. A crash box for a vehicle where at least a portion of the crash box (11,12) is positioned above a bumper beam (13), characterised in that the underside (22) of the crash box has a profiled cross-section with upper (25,26) and lower (24) longitudinal portions, said upper (25, 26) longitudinal portion of said profiled cross-section of said underside of said crash box having at least one raised profile portion which changes to being a downward-pointing profile portion (27,28) near to the outer end of the crash box, thereby increasing the vertical extent of the crash box, and said underside (22) has a hat profile with a crown (24) and side flanges, said hat profile changing to an inverted hat profile near to the outer end of the crash box.

2. A crash box according to claim 1, characterised in that said raised profile portion consists of the side flanges which at the outer portion of the crash box are bent downward so that the hat profile changes to the inverted hat profile.

3. A crash box according to claim 1, characterised in that it comprises upper and lower U-sections (20 and 21 respectively) which have their webs joined together in pairs so that the crash box has a closed profile.

4. A crash box accordingly to claim 2, characterised in that it comprises upper and lower U-sections (20 and 21 respectively) which have their webs joined together in pairs so that the crash box has a closed profile.

* * * * *